US012767740B2

(12) United States Patent
Ma et al.

(10) Patent No.: US 12,767,740 B2
(45) Date of Patent: Oct. 20, 2026

(54) MONOMODAL PROPYLENE RANDOM COPOLYMER WITH HIGH IMPACT STRENGTH

(71) Applicant: W.R. Grace & Co.-Conn, Columbia, MD (US)

(72) Inventors: Zhiru Ma, Ellicot City, MD (US); John K. Kaarto, Missouri City, TX (US)

(73) Assignee: W.R. Grace & Co.-Conn, Columbia, MD (US)

( * ) Notice: Subject to any disclaimer, the term of this patent is extended or adjusted under 35 U.S.C. 154(b) by 593 days.

(21) Appl. No.: 18/029,333

(22) PCT Filed: Oct. 1, 2021

(86) PCT No.: PCT/US2021/053165

§ 371 (c)(1),
(2) Date: Mar. 29, 2023

(87) PCT Pub. No.: WO2022/072825

PCT Pub. Date: Apr. 7, 2022

(65) Prior Publication Data

US 2024/0043590 A1 Feb. 8, 2024

Related U.S. Application Data

(60) Provisional application No. 63/086,947, filed on Oct. 2, 2020.

(51) Int. Cl.

*C08L 23/16* (2006.01)
*B65D 65/38* (2006.01)
*C08F 210/06* (2006.01)
*C08K 5/00* (2006.01)
*C08L 23/26* (2025.01)

(52) U.S. Cl.

CPC ............ *C08F 210/06* (2013.01); *B65D 65/38* (2013.01); *C08K 5/0083* (2013.01); *C08L 23/16* (2013.01); *C08F 2810/10* (2013.01); *C08L 23/26* (2013.01); *C08L 2023/42* (2013.01)

(58) Field of Classification Search

CPC .......... C08L 23/16; C08L 23/12; C08L 23/14; C08L 23/26; C08L 2023/42; C08K 5/0083

See application file for complete search history.

(56) References Cited

U.S. PATENT DOCUMENTS

| | | | | |
|---|---|---|---|---|
| 3,607,987 A * | 9/1971 | Walton | C09J 123/142 156/244.11 |
| 4,282,076 A * | 8/1981 | Boynton | C08F 8/50 522/912 |
| 4,375,531 A * | 3/1983 | Ross | C08L 53/00 525/88 |
| 4,552,930 A * | 11/1985 | Hirota | C08J 5/18 526/348 |
| 4,734,448 A * | 3/1988 | Kasahara | C08F 8/50 524/505 |
| 4,966,944 A * | 10/1990 | Kiang | C08L 23/12 525/88 |
| 5,804,304 A * | 9/1998 | Williams | C08L 23/0815 428/394 |
| 8,063,160 B2 * | 11/2011 | Cavalieri | C08F 10/00 526/348 |
| 8,207,285 B2 * | 6/2012 | Grazzi | C08J 5/18 526/348 |
| 10,870,937 B2 * | 12/2020 | Fiebig | C08F 8/50 |
| 12,006,426 B2 * | 6/2024 | Wang | C08J 5/18 |
| 12,071,535 B2 * | 8/2024 | Rego | C08K 5/1575 |
| 2009/0209706 A1 | 8/2009 | Sheard et al. | |
| 2011/0293869 A1 * | 12/2011 | Myhre | C08F 8/50 526/348 |
| 2015/0240063 A1 | 8/2015 | Vion | |
| 2020/0263016 A1 | 8/2020 | Werlang et al. | |

FOREIGN PATENT DOCUMENTS

| | | |
|---|---|---|
| EP | 2965908 A1 | 1/2016 |
| EP | 2 965 908 B1 | 3/2018 |
| JP | 2006016597 A | 1/2006 |
| WO | WO-2014/014491 A1 | 1/2014 |
| WO | WO 2019/197357 A1 | 10/2019 |
| WO | WO 2019/241063 A1 | 12/2019 |
| WO | WO 2020/064313 A1 | 4/2020 |

OTHER PUBLICATIONS

Extended European Search Report for EP application 21876592.3 Mailed Sep. 13, 2024, 11 pages.
Translation of Russian Search Report for Application No. 2023110999, dated Jul. 1, 2025, 2 pages.
International Search Report and Written Opinion on PCT PCT/US2021/053165 Dtd Jan. 14, 2022, 10 pages.

* cited by examiner

*Primary Examiner* — Rip A Lee
(74) *Attorney, Agent, or Firm* — Dority & Manning, P.A.

(57) ABSTRACT

Visbroken and monomodal random polypropylene copolymers are disclosed that have excellent impact resistance properties. Because the polymers are monomodal, the polymers also have excellent optical characteristics. In order to produce the polymers, a high molecular weight and low melt flow rate polypropylene polymer is combined with a visbreaking agent under molten conditions that has been found to dramatically improve impact resistance.

20 Claims, No Drawings

MONOMODAL PROPYLENE RANDOM COPOLYMER WITH HIGH IMPACT STRENGTH

RELATED APPLICATIONS

The present application is a U.S. National Stage of International Patent Application No. PCT/US2021/053165, filed Oct. 1, 2021, which claims priority to U.S. Provisional Patent Application Ser. No. 63/086,947, filed Oct. 2, 2020, both of which are incorporated herein by reference.

BACKGROUND

Polyolefin polymers are used in numerous and diverse applications and fields. Polyolefin polymers, for instance, are thermoplastic polymers that can be easily processed. The polyolefin polymers can also be recycled and reused. Polyolefin polymers are formed from hydrocarbons, such as propylene and alpha-olefins, which are obtained from petrochemicals and are abundantly available.

Polypropylene polymers, which are one type of polyolefin polymer, generally have a linear structure based on a propylene monomer. Polypropylene polymers can have various different stereospecific configurations. Polypropylene polymers, for example, can be isotactic, syndiotactic, and atactic. Isotactic polypropylene is perhaps the most common form and can be highly crystalline. Polypropylene polymers that can be produced include homopolymers, modified polypropylene polymers, and polypropylene copolymers which include polypropylene terpolymers. By modifying the polypropylene or copolymerizing the propylene with other monomers, various different polymers can be produced having desired properties for a particular application.

In one application, polypropylene polymers are formulated and designed to have high impact strength in combination with high clarity. The combination of a polymer with high impact strength and high clarity, for instance, can be very useful to produce various different products such as packaging or containers that not only protect the contents but also allow the contents of the packaging to be viewed through the walls of the container. Such polymers, for instance, can be used to produce all different types of containers, consumer products, appliance parts, and the like.

In the past, polypropylene polymers with high impact resistance were produced containing a homopolymer matrix blended with a rubber-like propylene-alpha-olefin copolymer phase. The copolymer phase increased impact resistance, such as at cold temperatures. The propylene-alpha-olefin copolymer can be mostly amorphous and thus have elastomeric properties forming a rubber phase within the polymer composition. The incorporation of the propylene-alpha-olefin copolymer into the heterophasic polymer composition does improve the impact resistance but sacrifices the optical characteristics. In another aspect, the heterophasic polymer can be produced by compounding different polymers together, such as blending a polypropylene polymer with a plastomer or a linear low density polyethylene.

In order to improve the transparency of heterophasic polypropylene polymers, attempts have been made to reduce the rubber phase size or to modify the ethylene content of the rubber but at the sacrifice of impact resistance particularly at colder temperature. In addition, various clarifiers have been added to the polymers to improve optics.

Although heterophasic polypropylene polymers have made great advances in the art, the polymers are somewhat complex to produce. For instance, the polymers are typically produced using multiple reactors and/or require particular compounding steps. Consequently, a need currently exists for a polypropylene polymer with high impact strength and good optical characteristics that can be produced in a single reactor. More particularly, a need exists for a polypropylene polymer that has high impact strength and low haze without the need to add a secondary phase.

SUMMARY

The present disclosure is generally directed to a monomodal polyolefin polymer having excellent impact resistance. A monomodal polymer is a polymer that is comprised of a single polymer produced in a single reactor. The polymer can also be formulated to have good optical characteristics, including low haze. The present disclosure is also directed to a process for producing the polymer. Of particular advantage, the high impact resistant polymer can be produced in a single reactor using a phthalate-free Ziegler-Natta catalyst.

In one aspect, for instance, the present disclosure is directed to a polymer composition comprising a monomodal, visbroken polypropylene polymer. The polypropylene polymer comprises a random propylene and alpha-olefin copolymer. The visbroken polypropylene polymer can have a melt flow rate of less than about 10 g/10 min at 23° C. and at a load of 2.16 kg and a polydispersity index of from about 2.5 to about 6, such as from about 2.5 to about 4. The polypropylene polymer has excellent impact resistance properties and can display an Izod impact resistance at 23° C. of greater than about 400 J/m, such as greater than about 450 J/m, such as greater than about 480 J/m, such as greater than about 500 J/m, such as greater than about 550 J/m and generally less than about 1100 J/m.

In addition to having excellent impact resistance properties, the polymer composition of the present disclosure can also display a relatively low haze. The polymer composition, for instance, can optionally contain a nucleating agent and can display a haze on an injection molded specimen produced in a polished mold having a thickness of 1 mm of less than about 15%, such as less than about 14%, such as less than about 13%, such as less than about 12%, such as less than about 11%. The nucleating agent can be, in one aspect, a clarifier, which is a type of nucleating agent.

The polypropylene polymer of the present disclosure can be produced by first forming a random polypropylene copolymer having a relatively high molecular weight and a relatively low melt flow rate. For example, the initial melt flow rate of the polymer can be less than about 2 g/10 min, such as less than about 1 g/10 min, such as less than about 0.5 g/10 min, such as less than about 0.3 g/10 min. The polypropylene polymer is then subjected to a visbreaking process where the polymer is contacted with a peroxide that increases the melt flow rate. For example, after visbreaking, the polypropylene polymer can undergo a cracking ratio of greater than about 2, such as greater than about 3, such as greater than about 4, such as greater than about 5, such as greater than about 7, such as greater than about 8, such as greater than about 9, such as greater than about 10, and generally less than about 20, such as less than about 15. The cracking ratio refers to the ratio of the final melt flow rate of the polypropylene polymer after being visbroken divided by the initial melt flow rate of the polypropylene polymer prior to being visbroken.

In one embodiment, the visbroken polypropylene polymer can have a melt flow rate of from about 0.4 g/10 min to about 1.5 g/10 min, such as from about 0.4 g/10 min to about 1.2 g/10 min and have a cracking ratio of from about 2 to about 8. In an alternative embodiment, the visbroken polypropylene polymer can have a melt flow rate of greater than about 0.8 g/10 min, such as greater than about 1.5 g/10 min, and generally less than about 4 g/10 min, such as less than about 3 g/10 min, such as less than about 2.5 g/10 min and can have a cracking ratio of from about 5 to about 20, such as from about 8 to about 12.

As described above, the polypropylene polymer is a random propylene and alpha-olefin copolymer. The alpha-olefin comonomer can be present in the polypropylene polymer in an amount from about 2.5% to about 6% by weight, such as in an amount from about 3% to about 5.7% by weight, such as in an amount from about 3.7% to about 4.6% by weight. The alpha-olefin comonomer can be, for instance, ethylene The polypropylene random copolymer can generally have a xylene soluble content of greater than about 5% by weight, such as in an amount from about 6% to about 20% by weight, such as in an amount from about 7% to about 15% by weight, such as in an amount from about 8% to about 12% by weight.

In one particular aspect, the polypropylene polymer is a random copolymer of propylene and ethylene containing ethylene in an amount from about 3.7% to about 4.6% by weight. The polypropylene polymer can have a xylene soluble content of from about 8% to about 15% and can have a melt flow rate of from about 1 g/10 min to about 4 g/10 min. The visbroken polypropylene copolymer can have a cracking ratio of from about 5 to about 20. The polymer composition containing the polypropylene polymer can also contain a nucleating agent and can display a haze at 1 mm of less than about 14%.

Various different molded articles can be made from the polymer composition of the present disclosure. The polymer composition can generally contain the polypropylene polymer in an amount greater than about 70% by weight, such as in an amount greater than about 80% by weight, such as in an amount greater than about 90% by weight, such as in an amount greater than about 95% by weight. The polymer composition can be used to produce injection molded articles, blow molded articles, and thermoformed articles. The polymer composition is particularly well suited to producing all different types of containers, such as storage containers including bottles and packaging. In one aspect, the polymer composition can be used to produce food packaging. In another aspect, the polymer composition can be used to produce extrusion blow molded bottles of any suitable size. In one embodiment, the bottle can include a molded handle and have an interior volume of from about 20 ounces to about 250 ounces. Containers made in accordance with the present disclosure can be semi-rigid or rigid with free standing walls.

The present disclosure is also directed to a method of producing a polypropylene polymer. The method includes the step of visbreaking a polypropylene random copolymer. The polypropylene random copolymer can be a propylene and alpha-olefin copolymer and can have an initial melt flow rate of less than about 2 g/10 min, such as less than about 1 g/10 min, such as less than about 0.5 g/10 min. The random propylene copolymer can contain the alpha-olefin comonomer in an amount from about 2.5% to about 5.7% by weight and can have a xylene soluble content of from about 6% to about 20% by weight. The random polypropylene copolymer is visbroken so as to achieve a cracking ratio of greater than about 3, such as greater than about 5, such as greater than about 8, and generally less than about 20, such as less than about 15. After being visbroken, the polypropylene copolymer displays an Izod impact resistance at 23° C. of greater than about 400 J/m. The polypropylene copolymer can optionally be combined with a nucleating agent, such as a clarifier, for achieving a haze at 1 mm of less than about 15%, such as less than about 13%.

Other features and aspects of the present disclosure are discussed in greater detail below.

DEFINITIONS AND TESTING PROCEDURES

Melt flow rate (MFR), as used herein, is measured in accordance with the ASTM D1238 test method at 230° C. with a 2.16 kg weight for propylene-based polymers. The melt flow rate can be measured in pellet form or on the reactor powder. When measuring the reactor powder, a stabilizing package is added including 2000 ppm of CYANOX 2246 antioxidant (methylenebis(4-methyl-6-tert-butylphenol), 2000 ppm of IRGAFOS 168 antioxidant (tris (2,4-di-tert.-butylphenyl)phosphite) and 1000 ppm of acid scavenger ZnO.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-06 using a 60 minute precipitation time and is also referred to herein as the "wet method".

The ASTM D5492-06 method mentioned above is used to determine the xylene soluble portion. In general, the procedure consists of weighing 2 g of sample and dissolving the sample in 200 ml o-xylene in a 400 ml flask with 24/40 joint. The flask is connected to a water cooled condenser and the contents are stirred and heated to reflux under nitrogen (N2), and then maintained at reflux for an additional 30 minutes. The solution is then cooled in a temperature controlled water bath at 25° C. for 60 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=[(m3−m2)*2/m1]*100, where m1 is the original weight of the sample used, m2 is the weight of empty aluminum pan, and m3 is the weight of the pan and residue (the asterisk, * here and elsewhere in the disclosure indicates that the identified terms or values are multiplied).

XS can also be measured according to the Viscotek method, as follows: 0.4 g of polymer is dissolved in 20 ml of xylenes with stirring at 130° C. for 60 minutes. The solution is then cooled to 25° C. and after 60 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration is maintained with Viscotek PolyCAL™ polystyrene standards. A polypropylene (PP) homopolymer, such as biaxially oriented polypropylene (BOPP) grade, is used as a reference material to ensure that the Viscotek instrument and sample preparation procedures provide consistent results. The value for the reference polypropylene homopolymer, is initially derived from testing using the ASTM method identified above.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. of the 24 World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:sec); (2) Diameter: 25 mm; (3) Truncation gap: 149 micron. The geometry of the bottom plate is 25 mm cylinder.

Testing Procedure (1) The cone & plate sample holder are heated in the ETC oven at 180° C. for 2 hours. Then the gap is zeroed under blanket of nitrogen gas.
(2) Cone is raised to 2.5 mm and sample loaded unto the top of the bottom plate
(3) Start timing for 2 minutes.
(4) The upper cone is immediately lowered to slightly rest on top of the sample by observing the normal force.
(5) After two minutes the sample is squeezed down to 165 micron gap by lower the upper cone.
(6) The normal force is observed. When the normal force is down to <0.05 Newton the excess sample is removed from the edge of the cone and plate sample holder by a spatula.
(7) The upper cone is lowered again to the truncation gap which is 149 micron
(8) An Oscillatory Frequency Sweep test is performed under these conditions:
    (i) Test delayed at 180° C. for 5 minutes.
    (ii) Frequencies: 628.3 r/s to 0.1 r/s.
    (iii) Data acquisition rate: 5 point/decade.
    (iv) Strain: 10%
(9) When the test is completed the crossover modulus (Gc) is detected by the Rheology Advantage Data Analysis program furnished by TA Instruments.
(10) PDI=100,000÷Gc (in Pa units).

The weight average molecular weight (Mw), the number average molecular weight (Mn), the molecular weight distribution (Mw/Mn) (also referred to as "MWD") and higher average molecular weights (Mz and Mz+1) are measured by high temperature GPC according to the Gel Permeation Chromatography (GPC) Analytical Method for Polypropylene. The polymers are analyzed on Polymer Char High Temperature GPC with IR5 MCT (Mercury Cadmium Telluride-high sensitivity, thermoelectrically cooled IR detector), Polymer Char four capillary viscometer, a Wyatt 8 angle MALLS and three Agilent Plgel Olexis (13 um). The oven temperature is set at 150° C. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 µl. A 2 mg/mL sample concentration is prepared by dissolving the sample in N2 purged and preheated TCB (containing 200 ppm BHT) for 2 hrs at 160° C. with gentle agitation.

The GPC column set is calibrated by running twenty narrow molecular weight distribution polystyrene standards. The molecular weight (MW) of the standards ranges from 266 to 12,000,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 160° C. for 60 min under stirring. The narrow standards mixtures are run first and in order of decreasing highest molecular weight component to minimize degradation effect. A logarithmic molecular weight calibration is generated using a fourth-order polynomial fit as a function of elution volume. The equivalent polypropylene molecular weights are calculated by using following equation with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{pp} = \frac{\left(K_{ps} M_{ps}^{aps+1}\right)^{\frac{1}{app}+1}}{K_{pp}}$$

where Mpp is PP equivalent MW, MPS is PS equivalent MW, log K and a values of Mark-Houwink coefficients for PP and PS are listed below.

TABLE 2

| Polymer | A | Log K |
|---|---|---|
| Polypropylene | 0.725 | −3.721 |
| Polystyrene | 0.702 | −3.900 |

The term "tacticity" generally refers to the relative stereochemistry of adjacent chiral centers within in a macromolecule or polymer. For example, in a propylene-based polymer, the chirality of adjacent monomers, such as two propylene monomers, can be of either like or opposite configuration. The term "diad" is used to designate two contiguous monomers and three adjacent monomers are called a "triad" If the chirality of adjacent monomers is of the same relative configuration, the diad is considered isotactic; if opposite in configuration, it is termed syndiotactic Another way to describe the configurational relationship is to term contiguous pairs of monomers having the same chirality as meso (m) and those of opposite configuration racemic (r).

Tacticity or stereochemistry of macromolecules generally and polypropylene or polypropylene random copolymers in particular can be described or quantified by referring to triad concentration. An isotactic triad, typically identified with the shorthand reference "mm", is made up of two adjacent meso diads, which have the same configuration, and so the stereoregularity of the triad is identified as "mm". If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in the polymer can be determined and when multiplied by 100 indicates the percentage of that type found in the polymer. The mm percentage is used to identify and characterize the polymers herein.

The sequence distribution of monomers in the polymer may be determined by $^{13}C$-NMR, which can also locate ethylene residues in relation to the neighboring propylene residues. $^{13}C$ NMR can be used to measure ethylene content, triad distribution, and triad tacticity, and is performed as follows:

The samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm NMR tube. The samples are dissolved and homogenized by heating the tube and its contents to 150° C. using a heating block. Each sample is visually inspected to ensure homogeneity.

The data are collected using a Bruker 400 MHz spectrometer equipped with a Bruker Dual DUL high-temperature CryoProbe. The data are acquired using 512 transients per data file, a 6 sec pulse repetition delay, 90 degree flip angles, and inverse gated decoupling with a sample temperature of 120° C. All measurements are made on non-spinning samples in locked mode Samples are allowed to thermally equilibrate for 10 minutes prior to data acquisition. Percent mm tacticity and weight % ethylene are calculated according to methods commonly used in the art, which is briefly summarized as follows.

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm). Each peak in the spectrum is assigned with reference to a literature source such as the articles in, for example, Polymer, T. Tsutsui et al., Vol. 30, Issue 7, (1989) 1350-1356 and/or Macromolecules, H. N. Cheng, 17 (1984) 1950-1955, the contents of which are incorporated herein by reference.

For convenience, ethylene content is also measured using a Fourier Transform Infrared method (FTIR) which is correlated to ethylene values determined using $^{13}C$ NMR, noted above, as the primary method. The relationship and agreement between measurements conducted using the two methods is described in, e.g., J. R. Paxson, J. C. Randall, "Quantitative Measurement of Ethylene Incorporation into Propylene Copolymers by Carbon-13 Nuclear Magnetic Resonance and Infrared Spectroscopy", Analytical Chemistry, Vol. 50, No 13, Nov. 1978, 1777-1780.

The Flexural modulus is determined in accordance with ASTM D790-10 Method A at 1.3 mm/min, using a Type 1 specimen per ASTM 3641 and molded according to ASTM D4101.

IZOD impact strength is measured in accordance with ASTM D 256 and D4101.

Haze is determined according to ASTM Test D1003, procedure A using the latest version of the test. Haze can be measured on a test plaque or on a molded article, such as a bottle, cup, container, or film. Haze can be measured using BYK Gardner Haze-Gard Plus 4725 instrument. Injection molded test samples that are tested for haze measurements can be injection molded at a temperature of from 200 to 230 C when a nonitol is present as a nucleating agent, at a temperature of from 250 to 260 C when a sorbitol is present as a nucleating agent, or at a temperature from 200 to 260 C when a non-soluble, particulate nucleating agent is present.

The melting point or melting temperature and the crystallization temperature are determined using differential scanning calorimetry (DSC). The melting point is the primary peak that is formed during the test and is typically the second peak that forms. The term "crystallinity" refers to the regularity of the arrangement of atoms or molecules forming a crystal structure. Polymer crystallinity can be examined using DSC. $T_{me}$ means the temperature at which the melting ends and $T_{max}$ means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composition and to a process for producing a polymer with high impact strength characteristics. The polymer composition can also be formulated to have excellent optic properties. The polyolefin polymer made in accordance with the present disclosure can be a random polypropylene copolymer, such as a random propylene and ethylene copolymer. The random polypropylene copolymer is first produced with a relatively high molecular weight and a relatively low melt flow rate. In accordance with the present disclosure, the random polypropylene copolymer is then subjected to a visbreaking step that increases the melt flow rate. The resulting visbroken polymer not only has improved flow and processing characteristics but also has a dramatic improvement in impact resistance.

Of particular advantage, the polypropylene polymer of the present disclosure can be produced in a single reactor. The resulting polypropylene polymer can be a substantially homogenous polymer that is monomodal. In the past, for instance, the impact resistance of polypropylene polymers was increased by producing a heterophasic polymer containing a matrix polymer combined with a rubber or elastomeric phase polymer. Although the rubber phase polymer increased impact resistance, the rubber phase polymer also adversely impacted the haze characteristics of the polymer composition. The polypropylene polymer made according to the present disclosure, on the other hand, is a monomodal polymer and thus has excellent haze properties and optical characteristics. In addition, the monomodal polypropylene polymer of the present disclosure can be made in a relatively efficient way without requiring multiple reactors or multiple compounding steps.

As will be explained in detail below, the polypropylene polymer of the present disclosure can also be produced using a phthalate-free catalyst. In one aspect, for instance, the polypropylene polymer can be Ziegler-Natta catalyzed using a substituted phenylene aromatic diester as the internal electron donor in the catalyst system.

Polyolefin polymers, such as polypropylene polymers, having high impact strength resistance and good optical characteristics are well suited for use in different applications in order to produce various different articles and products. Of particular advantage, the polypropylene polymer composition of the present disclosure can be used in all different types of molding processes. For instance, the polypropylene polymer composition can be injection molded, blow molded, thermoformed, and the like. The polypropylene polymer composition can be used to produce all different types of rigid and semi-rigid articles. For instance, the polypropylene polymer composition is well suited to producing all different types of containers, such as storage containers, bottles, food packaging containers, and the like. In one aspect, the polymer composition can be used to produce extrusion blow molded bottles of any suitable size. For example, the polymer composition can be used to produce bottles that hold consumer products, such as laundry detergent. The bottles can be formed with a handle.

In order to formulate the polypropylene polymer of the present disclosure, a random polypropylene copolymer is first produced that has a relatively high molecular weight and a relatively low melt flow rate. Of particular advantage, the polypropylene copolymer can be produced in a single reactor using a Ziegler-Natta catalyst as will be described in more detail below. In one aspect, the Ziegler-Natta catalyst used to produce the polymer is phthalate free.

The random polypropylene copolymer includes propylene as the primary monomer in combination with at least one other alpha-olefin comonomer. The alpha-olefin comonomer, for instance, can be ethylene. In one aspect, the random polypropylene copolymer contains alpha-olefin comonomer units in an amount greater than about 2.5% by weight, such as in an amount greater than about 3% by weight, such as in an amount greater than about 3.3% by weight, such as in an amount greater than about 3.7% by weight. The random polypropylene copolymer generally contains alpha-olefin comonomer units in an amount less than about 6% by weight, such as in an amount less than about 5.7% by weight, such as in an amount less than about 5.5% by weight, such as in an amount less than about 5.0% by weight, such as in an amount less than about 4.8% by weight, such as in an amount less than about 4.6% by weight.

The initial melt flow rate of the random polypropylene copolymer is generally less than about 2 g/10 min, such as less than about 1.5 g/10 min, such as less than about 1 g/10 min, such as less than about 0.8 g/10 min, such as less than about 0.5 g/10 min, such as less than about 0.4 g/10 min, such as less than about 0.3 g/10 min, such as less than about 0.2 g/10 min. The melt flow rate of the random polypropylene copolymer is generally greater than about 0.01 g/10 min, such as greater than about 0.08 g/10 min, such as greater than about 0.12 g/10 min.

The molecular weight (Mw) of the random polypropylene copolymer can generally be greater than about 350,000 g/mol, such as greater than about 400,000 g/mol, such as greater than about 450,000 g/mol, such as greater than about 500,000 g/mol, and generally less than about 1,000,000 g/mol, such as less than about 600,000 g/mol.

In accordance with the present disclosure, once the relatively high molecular weight and relatively low melt flow rate random polypropylene copolymer is produced, the polymer is subjected to a visbreaking process. During visbreaking, higher molar mass chains of the polypropylene polymer are broken in relation to the lower molar mass chains. Visbreaking results in an overall decrease in the average molecular weight of the polymer and an increase in the melt flow rate. Visbreaking can produce a polymer with a lower molecular weight distribution or polydispersity index. The amount of visbreaking that occurs within the polymer can be quantified using a cracking ratio. The cracking ratio is calculated by dividing the final melt flow rate of the polymer by the initial melt flow rate of the polymer. It was discovered that visbreaking a very high molecular weight polypropylene polymer, particularly a random polypropylene copolymer, can dramatically improve the impact resistance of the polymer without adversely affecting the optical properties of the polymer.

The random polypropylene copolymer can be subjected to visbreaking according to the present disclosure using a peroxide as a visbreaking agent. Typical peroxide visbreaking agents are 2,5-dimethyl-2,5-bis(tert.butyl-peroxy) hexane (DHBP), 2,5-dimethyl-2,5-bis(tert.butyl-peroxy) hexyne-3 (DYBP), dicumyl-peroxide (DCUP), di-tert.butyl-peroxide (DTBP), tert.butyl-cumyl-peroxide (BCUP) and bis(tert.butylperoxy-isopropyl)benzene (DIPP). The above peroxides can be used alone or in a blend.

Visbreaking the random polypropylene copolymer can be carried out during melt processing in an extruder. For instance, the random polypropylene copolymer can be fed through an extruder and the visbreaking agent can be added to the extruder once the polymer is in a molten state. Alternatively, the visbreaking agent can be preblended with the polypropylene polymer. In one aspect, for instance, the visbreaking agent can be first compounded with a polymer, such as a polypropylene polymer to form a masterbatch. The masterbatch containing the visbreaking agent can then be blended with the polypropylene polymer and fed through an extruder. In general, any suitable extruder can be used during visbreaking. For instance, the extruder can be a single-screw extruder, a contra-rotating twin-screw extruder, a co-rotating twin-screw extruder, a planetary-gear extruder, a ring extruder, or any suitable kneading apparatus.

The amount of visbreaking agent added to the random polypropylene copolymer can depend upon various factors, including the cracking ratio that is desired. In general, the visbreaking agent or peroxide can be added to the random polypropylene copolymer in an amount greater than about 0.001% by weight, such as greater than about 0.005% by weight, such as greater than about 0.01% by weight, such as greater than about 0.015% by weight, such as greater than about 0.02% by weight, such as greater than about 0.04% by weight, such as greater than about 0.1% by weight, such as greater than about 0.2% by weight, In general, the visbreaking agent is added to the polypropylene polymer in an amount less than about 1% by weight, such as in an amount less than about 0.5% by weight, such as in an amount less than about 0.3% by weight.

After visbreaking, the random polypropylene copolymer has a higher melt flow rate and can also have a narrower molecular weight distribution or polydispersity index. In general, the polypropylene polymer can be subjected to visbreaking so as to have a cracking ratio of greater than about 3, such as greater than about 3.5, such as greater than about 5, such as greater than about 8, such as greater than about 10 and generally less than about 20, such as less than about 15, such as less than about 12. The melt flow rate of the visbroken polymer is generally greater than about 0.5 g/10 min, such as greater than about 0.8 g/10 min, such as greater than about 1.2 g/10 min, such as greater than about 1.5 g/10 min, such as greater than about 1.8 g/10 min. The melt flow rate of the visbroken polymer is generally less than about 10 g/10 min, such as less than about 7 g/10 min, such as less than about 5 g/10 min, such as less than about 3 g/10 min, such as less than about 2.5 g/10 min.

The polydispersity index of the visbroken random polypropylene copolymer is generally greater than about 2.5, such as greater than about 3 and generally less than about 4.

The visbroken random polypropylene copolymer generally has low molecular weight components. For example, the visbroken polymer can have a xylene soluble content of greater than about 5%, such as greater than about 6%, such as greater than about 7%, such as greater than about 8%, such as greater than about 9%, such as greater than about 10%. The xylene soluble content of the visbroken polymer is generally less than about 20%, such as less than about 15%, such as less than about 13%, such as less than about 12% by weight.

It was discovered that visbreaking the high molecular weight random polypropylene copolymer can dramatically improve impact resistance. For example, the Izod impact resistance properties of the polymer can increase by greater than about 20%, such as greater than about 30%, such as greater than about 40%, such as even greater than about 50%. The visbroken polymer, for instance, can have an Izod impact resistance at 23° C. of greater than about 400 J/m, such as greater than about 450 J/m, such as greater than about 480 J/m, such as greater than about 500 J/m, such as greater than about 520 J/m, such as greater than about 550 J/m, such as greater than about 570 J/m, such as even greater than about 600 J/m. The impact resistance is generally less than about 1100 J/m.

In addition to excellent impact resistant properties, the polypropylene polymer of the present disclosure also has excellent optical characteristics, especially when combined with a nucleating agent. For example, a polymer composition containing the polypropylene polymer can display a haze at 1 mm of less than about 15%, such as less than about 14%, such as less than about 12%, such as less than about 11%. The polymer can display a haze at 1.6 mm of generally less than about 20%, such as less than about 18%, such as less than about 17%. When tested at a thickness of 3 mm, the polymer composition can display a haze of less than about 43%, such as less than about 42%. The above haze characteristics can be measured on an injection molded article.

As described above, the polypropylene polymer is Ziegler-Natta catalyzed. The catalyst can include a solid catalyst component that can vary depending upon the particular application.

The solid catalyst component can include (i) magnesium, (ii) a transition metal compound of an element from Periodic Table groups IV to VIII, (iii) a halide, an oxyhalide, and/or an alkoxide of (i) and/or (ii), and (iv) combinations of (i), (ii), and (iii). Nonlimiting examples of suitable catalyst components include halides, oxyhalides, and alkoxides of magnesium, manganese, titanium, vanadium, chromium, molybdenum, zirconium, hafnium, and combinations thereof.

In one embodiment, the preparation of the catalyst component involves halogenation of mixed magnesium and titanium alkoxides.

In various embodiments, the catalyst component is a magnesium moiety compound (MagMo), a mixed magnesium titanium compound (MagTi), or a benzoate-containing magnesium chloride compound (BenMag). In one embodiment, the catalyst precursor is a magnesium moiety ("MagMo") precursor. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di($C_{1-4}$)alkoxide. In a further embodiment, the MagMo precursor is diethoxymagnesium.

In another embodiment, the catalyst component is a mixed magnesium/titanium compound ("MagTi"). The "MagTi precursor" has the formula $Mg_dTi(OR^e)fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

In another embodiment, the catalyst precursor is a benzoate-containing magnesium chloride material ("BenMag"). As used herein, a "benzoate-containing magnesium chloride" ("BenMag") can be a catalyst (i.e., a halogenated catalyst component) containing a benzoate internal electron donor. The BenMag material may also include a titanium moiety, such as a titanium halide. The benzoate internal donor is labile and can be replaced by other electron donors during catalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. In an embodiment, the BenMag catalyst component may be a product of halogenation of any catalyst component (i.e., a MagMo precursor or a MagTi precursor) in the presence of a benzoate compound.

In another embodiment, the solid catalyst component can be formed from a magnesium moiety, a titanium moiety, an epoxy compound, an organosilicon compound, and an internal electron donor. In one embodiment, an organic phosphorus compound can also be incorporated into the solid catalyst component. For example, in one embodiment, a halide-containing magnesium compound can be dissolved in a mixture that includes an epoxy compound, an organic phosphorus compound, and a hydrocarbon solvent. The resulting solution can be treated with a titanium compound in the presence of an organosilicon compound and optionally with an internal electron donor to form a solid precipitate. The solid precipitate can then be treated with further amounts of a titanium compound. The titanium compound used to form the catalyst can have the following chemical formula:

$Ti(OR)_gX_{4-g}$ where each R is independently a $C_1$-$C_4$ alkyl; X is Br, Cl, or I; and g is 0, 1, 2, 3, or 4.

In some embodiments, the organosilicon is a monomeric or polymeric compound. The organosilicon compound may contain —Si—O—Si— groups inside of one molecule or between others. Other illustrative examples of an organosilicon compound include polydialkylsiloxane and/or tetraalkoxysilane. Such compounds may be used individually or as a combination thereof. The organosilicon compound may be used in combination with aluminum alkoxides and an internal electron donor.

The aluminum alkoxide referred to above may be of formula $Al(OR')_3$ where each R' is individually a hydrocarbon with up to 20 carbon atoms. This may include where each R' is individually methyl, ethyl, n-propyl, iso-propyl, n-butyl, sec-butyl, tert-butyl, n-pentyl, iso-pentyl, neo-pentyl, etc.

Examples of the halide-containing magnesium compounds include magnesium chloride, magnesium bromide, magnesium iodide, and magnesium fluoride. In one embodiment, the halide-containing magnesium compound is magnesium chloride.

Illustrative of the epoxy compounds include, but are not limited to, glycidyl-containing compounds of the Formula:

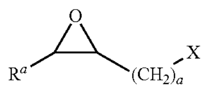

wherein “a” is from 1, 2, 3, 4, or 5, X is F, Cl, Br, I, or methyl, and Ra is H, alkyl, aryl, or cyclyl. In one embodiment, the alkylepoxide is epichlorohydrin. In some embodiments, the epoxy compound is a haloalkylepoxide or a nonhaloalkylepoxide.

As an example of the organic phosphorus compound, phosphate acid esters such as trialkyl phosphate acid ester may be used. Such compounds may be represented by the formula:

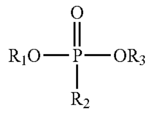

wherein $R_1$, $R_2$, and $R_3$ are each independently selected from the group consisting of methyl, ethyl, and linear or branched ($C_3$-$C_{10}$) alkyl groups. In one embodiment, the trialkyl phosphate acid ester is tributyl phosphate acid ester.

In still another embodiment, a substantially spherical $MgCl_2$-nEtOH adduct may be formed by a spray crystallization process. In the process, a $MgCl_2$-nROH melt, where n is 1-6, is sprayed inside a vessel while conducting inert gas at a temperature of 20-80° C. into the upper part of the vessel. The melt droplets are transferred to a crystallization area into which inert gas is introduced at a temperature of −50 to 20° C. crystallizing the melt droplets into nonagglomerated, solid particles of spherical shape. The spherical $MgCl_2$ particles are then classified into the desired size. Particles of undesired size can be recycled. In preferred embodiments for catalyst synthesis the spherical $MgCl_2$ precursor has an average particle size (Malvern $d_{50}$) of between about 15-150 microns, preferably between 20-100 microns, and most preferably between 35-85 microns.

The catalyst component may be converted to a solid catalyst by way of halogenation. Halogenation includes contacting the catalyst component with a halogenating agent in the presence of the internal electron donor. Halogenation converts the magnesium moiety present in the catalyst component into a magnesium halide support upon which the titanium moiety (such as a titanium halide) is deposited. Not wishing to be bound by any particular theory, it is believed that during halogenation the internal electron donor (1) regulates the position of titanium on the magnesium-based support, (2) facilitates conversion of the magnesium and titanium moieties into respective halides and (3) regulates the crystallite size of the magnesium halide support during conversion. Thus, provision of the internal electron donor yields a catalyst composition with enhanced stereoselectivity.

In an embodiment, the halogenating agent is a titanium halide having the formula $Ti(OR^e)_fX_h$ wherein R and X are defined as above, f is an integer from 0 to 3; h is an integer from 1 to 4; and f+h is 4. In an embodiment, the halogenating agent is $TiCl_4$. In a further embodiment, the halogenation is conducted in the presence of a chlorinated or a non-chlorinated aromatic liquid, such as dichlorobenzene, o-chlorotoluene, chlorobenzene, benzene, toluene, or xylene. In yet another embodiment, the halogenation is conducted by use of a mixture of halogenating agent and chlorinated aromatic liquid comprising from 40 to 60 volume percent halogenating agent, such as $TiCl_4$.

The reaction mixture can be heated during halogenation. The catalyst component and halogenating agent are contacted initially at a temperature of less than about 10° C., such as less than about 0° C., such as less than about −10° C., such as less than about −20° C., such as less than about −30° C. The initial temperature is generally greater than about −50° C., such as greater than about −40° C. The mixture is then heated at a rate of 0.1 to 10.0° C./minute, or at a rate of 1.0 to 5.0° C./minute. The internal electron donor may be added later, after an initial contact period between the halogenating agent and catalyst component. Temperatures for the halogenation are from 20° C. to 150° C. (or any value or subrange therebetween), or from 0° C. to 120° C. Halogenation may be continued in the substantial absence of the internal electron donor for a period from 5 to 60 minutes, or from 10 to 50 minutes.

The manner in which the catalyst component, the halogenating agent and the internal electron donor are contacted may be varied. In an embodiment, the catalyst component is first contacted with a mixture containing the halogenating agent and a chlorinated aromatic compound. The resulting mixture is stirred and may be heated if desired. Next, the internal electron donor is added to the same reaction mixture without isolating or recovering of the precursor. The foregoing process may be conducted in a single reactor with addition of the various ingredients controlled by automated process controls.

In one embodiment, the catalyst component is contacted with the internal electron donor before reacting with the halogenating agent.

Contact times of the catalyst component with the internal electron donor are at least 10 minutes, or at least 15 minutes, or at least 20 minutes, or at least 1 hour at a temperature from at least −30° C., or at least −20° C., or at least 10° C. up to a temperature of 150° C., or up to 120° C., or up to 115° C., or up to 110° C.

In one embodiment, the catalyst component, the internal electron donor, and the halogenating agent are added simultaneously or substantially simultaneously.

The halogenation procedure may be repeated one, two, three, or more times as desired. In an embodiment, the resulting solid material is recovered from the reaction mixture and contacted one or more times in the absence (or in the presence) of the same (or different) internal electron donor components with a mixture of the halogenating agent in the chlorinated aromatic compound for at least about 10 minutes, or at least about 15 minutes, or at least about 20 minutes, and up to about 10 hours, or up to about 45 minutes, or up to about 30 minutes, at a temperature from at least about −20° C., or at least about 0° C., or at least about 10° C., to a temperature up to about 150° C., or up to about 120° C., or up to about 115° C.

After the foregoing halogenation procedure, the resulting solid catalyst composition is separated from the reaction medium employed in the final process, by filtering for example, to produce a moist filter cake. The moist filter cake may then be rinsed or washed with a liquid diluent to remove unreacted $TiCl_4$ and may be dried to remove residual liquid, if desired. Typically, the resultant solid catalyst composition is washed one or more times with a "wash liquid," which is a liquid hydrocarbon such as an aliphatic hydrocarbon such as isopentane, isooctane, isohexane, hexane, pentane, or octane. The solid catalyst composition then can be separated and dried or slurried in a hydrocarbon, especially a relatively heavy hydrocarbon such as mineral oil for further storage or use.

In one embodiment, the resulting solid catalyst composition has a titanium content of from about 1.0 percent by weight to about 6.0 percent by weight, based on the total solids weight, or from about 1.5 percent by weight to about 4.5 percent by weight, or from about 2.0 percent by weight to about 3.5 percent by weight. The weight ratio of titanium to magnesium in the solid catalyst composition is suitably between about 1:3 and about 1:160, or between about 1:4 and about 1:50, or between about 1:6 and 1:30. In an embodiment, the internal electron donor may be present in the catalyst composition in a molar ratio of internal electron donor to magnesium of from about 0.005:1 to about 1:1, or from about 0.01:1 to about 0.4:1. Weight percent is based on the total weight of the catalyst composition.

The catalyst composition may be further treated by one or more of the following procedures prior to or after isolation of the solid catalyst composition. The solid catalyst composition may be contacted (halogenated) with a further quantity of titanium halide compound, if desired; it may be exchanged under metathesis conditions with an acid chloride, such as phthaloyl dichloride or benzoyl chloride; and it may be rinsed or washed, heat treated; or aged. The foregoing additional procedures may be combined in any order or employed separately, or not at all.

As described above, the catalyst composition can include a combination of a magnesium moiety, a titanium moiety and the internal electron donor. The catalyst composition is produced by way of the foregoing halogenation procedure which converts the catalyst component and the internal electron donor into the combination of the magnesium and titanium moieties, into which the internal electron donor is incorporated. The catalyst component from which the catalyst composition is formed can be any of the above described catalyst precursors, including the magnesium moiety precursor, the mixed magnesium/titanium precursor, the benzoate-containing magnesium chloride precursor, the magnesium, titanium, epoxy, and phosphorus precursor, or the spherical precursor.

Various different types of internal electron donors may be incorporated into the solid catalyst component. In one aspect, the internal electron donor is phthalate-free. In fact, all of the catalyst components used to produce the polymer can be phthalate-free. In one embodiment, the internal electron donor is an aryl diester, such as a phenylene-substituted diester. In one embodiment, the internal electron donor may have the following chemical structure:

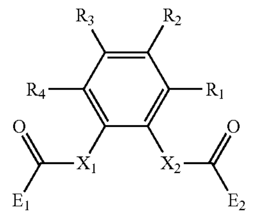

wherein $R_1$ $R_2$, $R_3$ and $R_4$ are each a hydrocarbyl group having from 1 to 20 carbon atoms, the hydrocarbyl group having a branched or linear structure or comprising a cycloalkyl group having from 7 to 15 carbon atoms, and where $E_1$ and $E_2$ are the same or different and selected from the group consisting of an alkyl having 1 to 20 carbon atoms, a substituted alkyl having 1 to 20 carbon atoms, an aryl having 1 to 20 carbon atoms, a substituted aryl having 1 to 20 carbon atoms, or an inert functional group having 1 to 20 carbon atoms and optionally containing heteroatoms, and wherein $X_1$ and $X_2$ are each O, S, an alkyl group, or NRs and wherein $R_5$ is a hydrocarbyl group having 1 to 20 carbon atoms or is hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In one aspect, the substituted phenylene diester has the following structure (I):

(I)

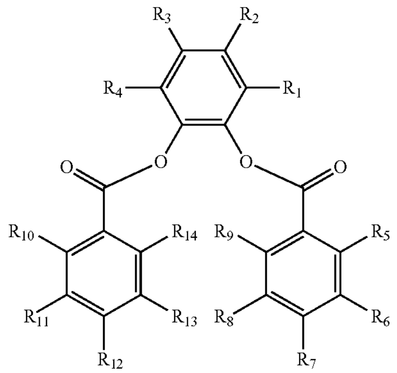

In an embodiment, structure (I) includes $R_1$ and $R_3$ that is an isopropyl group. Each of $R_2$, $R_4$ and $R_5$-$R_{14}$ is hydrogen.

In an embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In an embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes each of $R_1$, $R_5$, $R_7$, $R_9$, $R_{10}$, $R_{12}$, and $R_{14}$ as a methyl group and $R_3$ is a t-butyl group Each of $R_2$, $R_4$, $R_6$, $R_8$, $R_{11}$, and $R_{13}$ is hydrogen.

In an embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure selected from the group consisting of structures (II)-(V), including alternatives for each of $R_1$ to $R_{14}$, that are described in detail in U.S. Pat. No. 8,536,372, which is incorporated herein by reference.

In an embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In an embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In an embodiment, structure (I) includes $R_1$ that is a methyl group and $R_3$ is a t-butyl group. Each of $R_2$, $R_4$ and $R_5$-$R_{14}$ is a fluorine atom.

In an embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In one aspect, structure (I) includes $R_1$ and $R_4$ as $C_1$ to $C_4$ alkyl groups, such as methyl groups. One of $R_2$ or $R_3$ is heteogen and the other is a cycloalkyl group. For example, $R_2$ or $R_3$ can be a cyclopentyl group, a cyclohexal group, or a cyclooctyl group. $R_5$ through $R_{14}$, on the other hand, can be hydrogen.

In an embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a diethylamino group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In an embodiment, structure (1) includes $R_1$ and $R_3$, each of which is a sec-butyl group. Each of $R_2$, $R_4$ and $R_5$-$R_{14}$ is hydrogen.

In an embodiment, structure (I) includes $R_1$ and $R_4$ that are each a methyl group. Each of $R_2$, $R_3$, $R_5$-$R_9$ and $R_{10}$-$R_{14}$ is hydrogen.

In an embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In an embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In addition to the solid catalyst component as described above, the catalyst system of the present disclosure can also include a cocatalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In an embodiment, the cocatalyst is selected from triethylaluminum, triisobutylaluminum, tri-n-hexylaluminum, diisobutylaluminum hydride, and di-n-hexylaluminum hydride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

Suitable catalyst compositions can include the solid catalyst component, a co-catalyst, and an external electron donor that can be a mixed external electron donor (M-EED) of two or more different components. Suitable external electron donors or "external donor" include one or more activity limiting agents (ALA) and/or one or more selectivity control agents (SCA). As used herein, an "external donor" is a component or a composition comprising a mixture of components added independent of procatalyst formation that modifies the catalyst performance. As used herein, an "activity limiting agent" is a composition that decreases catalyst activity as the polymerization temperature in the presence of the catalyst rises above a threshold temperature (e.g., temperature greater than about 95° C.). A "selectivity control agent" is a composition that improves polymer tacticity, wherein improved tacticity is generally understood to mean increased tacticity or reduced xylene solubles or both. It should be understood that the above definitions are not mutually exclusive and that a single compound may be classified, for example, as both an activity limiting agent and a selectivity control agent.

A selectivity control agent in accordance with the present disclosure is generally an organosilicon compound. For example, in one aspect, the selectively control agent can be an alkoxysilane.

In one embodiment, the alkoxysilane can have the following general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. In one embodiment, for instance, the second selectivity control agent may comprise n-propyltriethoxysilane. Other selectively control agents that can be used include propyltriethoxysilane or diisobutyldimethoxysilane.

In one embodiment, the catalyst system may include an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester. The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleates, a sebacate, (polyxalkylene glycol) mono- or diacetates, (polyxalkylene glycol) mono- or di-myristates, (polyxalkylene glycol) mono- or di-laurates, (polyxalkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate, di-n-butyl sebacate and/or pentyl valerate.

In one embodiment, the selectivity control agent and/or activity limiting agent can be added into the reactor separately. In another embodiment, the selectivity control agent and the activity limiting agent can be mixed together in advance and then added into the reactor as a mixture. In addition, the selectivity control agent and/or activity limiting agent can be added into the reactor in different ways. For example, in one embodiment, the selectivity control agent and/or the activity limiting agent can be added directly into the reactor, such as into a fluidized bed reactor. Alternatively, the selectivity control agent and/or activity limiting agent can be added indirectly to the reactor volume by being fed through, for instance, a cycle loop. The selectivity control agent and/or activity limiting agent can combine with the catalyst particles within the cycle loop prior to being fed into the reactor.

The catalyst system of the present disclosure as described above can be used for producing olefin-based polymers. The process includes contacting an olefin with the catalyst system under polymerization conditions.

One or more olefin monomers can be introduced into a polymerization reactor to react with the catalyst system and to form a polymer, such as a fluidized bed of polymer particles. The primary olefin monomer for instance, can be propylene and can be combined with one or more alpha-olefin comonomers, such as ethylene. Any suitable reactor may be used including a fluidized bed reactor, a stirred gas reactor, moving packed bed reactor, a multizone reactor, a bulk phase reactor, a slurry reactor or combinations thereof. Suitable commercial reactors include the UNIPOL reactor, the SPHERIPOL, the SPHERIZONE reactor and the like. In one embodiment, the polymer is produced in a single reactor.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one reactor.

In one embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In one embodiment, the contacting occurs by way of feeding the catalyst composition into a polymerization reactor and introducing the olefin into the polymerization reactor. In an embodiment, the cocatalyst can be mixed with the catalyst composition (pre-mix) prior to the introduction of the catalyst composition into the polymerization reactor. In another embodiment, the cocatalyst is added to the polymerization reactor independently of the catalyst composition. The independent introduction of the cocatalyst into the polymerization reactor can occur simultaneously, or substantially simultaneously, with the catalyst composition feed.

In one embodiment, the polymerization process may include a pre-activation step. Pre-activation includes contacting the catalyst composition with the co-catalyst and the selectivity control agent and/or the activity limiting agent. The resulting preactivated catalyst stream is subsequently introduced into the polymerization reaction zone and contacted with the olefin monomer to be polymerized. Optionally, additional quantities of the selectivity control agent and/or the activity limiting agent may be added.

The process can include mixing the selectivity control agent (and optionally the activity limiting agent) with the catalyst composition. The selectivity control agent can be complexed with the cocatalyst and mixed with the catalyst composition (pre-mix) prior to contact between the catalyst composition and the olefin. In another embodiment, the selectivity control agent and/or the activity limiting agent can be added independently to the polymerization reactor. In one embodiment, the selectivity control agent and/or the activity limiting agent can be fed to the reactor through a cycle loop.

Polypropylene polymers made according to the present disclosure can be incorporated into various polymer compositions for producing molded articles. The polymer composition, for instance, can contain the high impact resistant, monomodal, random polypropylene copolymer generally in an amount greater than about 70% by weight, such as in an amount greater than about 80% by weight, such as in an amount greater than about 90% by weight, such as in an amount greater than about 95% by weight. In addition to the random polypropylene copolymer, the polymer composition can contain various additives and ingredients. For instance, the polymer composition can contain one or more antioxidants. For example, in one aspect, the polymer composition can contain a sterically hindered phenolic antioxidant and/or a phosphite antioxidant. The polymer composition can also contain an acid scavenger, such as calcium stearate. In addition, the polymer composition can contain a coloring agent, a UV stabilizer, or the like. Each of the above additives can be present in the polymer composition generally in an amount from about 0.015% to about 2% by weight.

The polymer composition of the present disclosure can be molded into various different articles and products using any suitable molding process. For instance, the polymer composition can be injection molded, can be used in an extrusion blow molding process or can be used in a thermal forming process.

In one embodiment, the copolymer composition can further contain a nucleating agent. The nucleating agent can be added to further improve the transparency properties of the composition. In one aspect, the nucleating agent can be a clarifying agent that can comprise a compound capable of producing a gelation network within the composition.

In one embodiment, the nucleating agent may comprise a sorbitol compound, such as a sorbitol acetal derivative. In one embodiment, for instance, the nucleating agent may comprise a dibenzyl sorbitol.

With regard to sorbitol acetal derivatives that can be used as an additive in some embodiments, the sorbitol acetal derivative is shown in Formula (I):

(I)

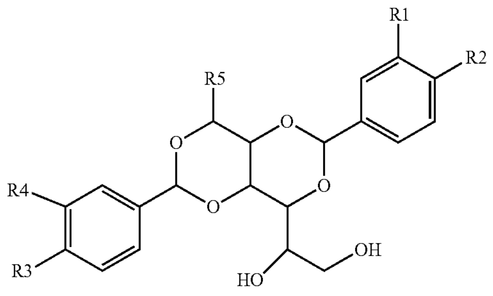

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis(3,4-dimethylbenzylidene) sorbitol ("DMDBS"). In some embodiments, R2, R3, and R5 are propyl groups (—CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of nucleating agents that may be used include 1,3:2,4-dibenzylidenesorbitol;
1,3:2,4-bis(p-methylbenzylidene)sorbitol;
Di(p-methylbenzylidene)Sorbitol;
Di(p-ethylbenzylidene)Sorbitol; and
Bis(5',6',7',8'-tetrahydro-2-naphthylidene)Sorbitol.

In one embodiment, the nucleating agent may also comprise a bisamide, such as benzenetrisamide. The nucleating agents described above can be used alone or in combination.

The nucleating agent can also comprise a phosphate ester, a dicarboxylate metal salt, or mixtures thereof. In one aspect, the nucleating agent can be a metal salt of hexahydrophthalic acid, such as calcium hexahydrophthalic acid. In another aspect, the nucleating agent can be a bicyclic dicarboxylate metal salt. For instance, the nucleating agent can be disodium bicyclo[2.2.1]heptane-2,3-dicarboxylate.

Other nucleating agents that may be used include ADK NA-11 (Methylen-bis(4,6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) which are commercially available from Asahi Denka Kokai. Millad NX8000 (nonitol, 1,2,3-trideoxy-4,6:5,7-bis-O-[(4-propylphenyl)methylene)], Millad 3988 (3,4-Dimethylbenzylidene sorbitol), Millad 3905 and Millad 3940 available from Milliken & Company are other examples of clarifying/nucleating agents that can also be utilized.

Further commercial available alpha-nucleating agents, which can be used for the composition are, for example, Irgaclear XT 386 (N-[3,5-bis-(2,2-dimethyl-propionylamino)-phenyl]-2,2-dimethylpropionamide) from Ciba Specialty Chemicals, Hyperform HPN-68L and Hyperform HPN-20E from Milliken & Company.

The one or more nucleating agents can be present in the polymer composition in an amount greater than about 100 ppm, such as in an amount greater than about 300 ppm, such as in an amount greater than about 1000 ppm, such as in an amount greater than about 2000 ppm, and generally less than about 20,000 ppm, such as less than about 10,000 ppm, such as less than about 4000 ppm.

When the one or more nucleating agents are clarifying agents, the clarifying agents can be added in an amount greater than about 1,500 ppm, such as in an amount greater than about 1,800 ppm, such as in an amount greater than about 2,000 ppm, such as in an amount greater than about 2,200 ppm. One or more clarifying agents are generally present in an amount less than about 20,000 ppm, such as less than about 15,000 ppm, such as less than about 10,000 ppm, such as less than about 8,000 ppm, such as less than about 5,000 ppm.

As described above, polymer compositions made according to the present disclosure offer numerous advantages and benefits. The random polypropylene copolymer with improved impact resistance strength, for instance, can be formed using a single reactor. The resulting polypropylene copolymer can be a polymer that is monomodal. Thus, not only is the polypropylene polymer efficient to make and produce but also inherently possesses excellent optical characteristics, such as low haze.

The present disclosure may be better understood with reference to the following example.

EXAMPLE

Various different random polypropylene copolymers were made and tested for physical properties. More particularly, random propylene and butene copolymers and a random propylene and ethylene copolymer were produced and compared with random propylene and ethylene copolymers made in accordance with the present disclosure. All of the random polypropylene copolymers were produced in a gas phase reactor using a phthalate-free catalyst system that included a substituted phenylene aromatic diester as the internal electron donor. The catalyst system used was CONSISTA catalyst, commercially available from W.R. Grace & Company. All the copolymers were made using external electron donors and triethylaluminum as a cocatalyst.

Sample Nos. 6, 7 and 8 in the table below were made in accordance with the present disclosure. Sample Nos. 6, 7 and 8 were subjected to a visbreaking process in which the random copolymers were contacted with a peroxide visbreaking agent in an extruder. The visbreaking agent used was 3,6,9-Triethyl-3,6,9-trimethyl-1,4,7-triperoxonane.

Each random polypropylene copolymer was combined with an additive package including 2500 ppm of NX 8000E or 2000 ppm NX8000 nucleating agent commercially available from Milliken.

The polymer compositions were then tested for various properties. The following results were obtained:

| Sample No. | MFR (g/10 min) | Cracking ratio | XS (wt %) | Et % (wt) | Bt % (wt) | IZOD (J/m) | Flex-Mod (MPa) | Tensile Strength (MPa) | Haze 1.0 mm | Haze 1.6 mm | Haze 3.0 mm | Tm (° C.) | Tc (° C.) | GPC MWD | Polydispersity IndexI PI |
|---|---|---|---|---|---|---|---|---|---|---|---|---|---|---|---|
| 1 | 3.4 | na | 4.8 | | 5.7 | 83 | 1333 | 34 | 14.2 | 21.7 | 49.9 | 151 | 121 | 7.1 | 5.1 |
| 2 | 3.3 | na | 4.9 | | 5.8 | 78 | 1316 | 33 | 14.2 | 22.1 | 50.4 | 151 | 121 | 7.0 | 5.0 |
| 3 | 2.9 | na | 5.3 | | 7.3 | 92 | 1230 | 32 | 12.8 | 19.7 | 47.3 | 148 | 119 | 6.8 | 5.1 |
| 4 | 2.9 | na | 5.2 | | 7.4 | 100 | 1204 | 32 | 13.2 | 20.5 | 47.5 | 149 | 118 | 6.7 | 4.9 |
| 5 | 2.3 | na | 9.1 | 3.2 | | 333 | 977 | 28 | 12.1 | 18.6 | 43.9 | 147 | 119 | 5.8 | 5.0 |
| 6 | 1.9 | 10 | 11.3 | 4.2 | | 502 | 767 | 25 | 10.4 | 15.0 | 41.1 | 144 | 115 | 4.6 | 2.8 |
| 7 | 0.8 | 4 | 11.2 | 4.1 | | 624 | 796 | 25 | 13.4 | 17.1 | 40.7 | 143 | 115 | 4.8 | 3.8 |
| 8 | 1.5 | 6 | 10.1 | 4.3 | | 570 | 750 | 24 | 7.4 | 13.5 | 24.5 | 142 | 114 | 4.7 | 3.1 |

As shown above, the visbroken polypropylene polymers made according to the present disclosure had dramatically improved Izod impact resistance strength. Sample Nos. 6, 7 and 8 also displayed improved optical properties.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention as further described in such appended claims.

What is claimed:

1. A polymer composition comprising:

a monomodal, visbroken polypropylene polymer, the visbroken polypropylene polymer comprising a random propylene and alpha-olefin copolymer, the visbroken polypropylene polymer having a melt flow rate of less than about 10 g/10 min at 230° C. and at a load of 2.16 kg and a polydispersity index of from about 2.5 to about 4, the visbroken polypropylene polymer displays an Izod impact resistance at 23° C. of greater than about 400 J/m, the polymer composition optionally contains a nucleating agent.

2. The polymer composition of claim 1, wherein the polymer composition contains the nucleating agent, the polymer composition displays a haze at 1 mm of less than about 15%.

3. The polymer composition of claim 1, wherein the visbroken polypropylene polymer has a melt flow rate of from about 0.8 g/10 min to about 4 g/10 min, and the visbroken polypropylene polymer has a cracking ratio of from about 4 to about 20.

4. The polymer composition of claim 1, wherein the visbroken polypropylene polymer has a melt flow rate of from about 0.4 g/10 min to about 1.5 g/10 min, and the visbroken polypropylene polymer has a cracking ratio of from about 2 to about 8.

5. The polymer composition of claim 1, wherein the random propylene and alpha-olefin copolymer is a propylene and ethylene random copolymer.

6. The polymer composition of claim 1, wherein the random propylene and alpha-olefin copolymer contains the alpha-olefin in an amount from about 2.5% by weight to about 5.5% by weight.

7. The polymer composition of claim 1, wherein the visbroken polypropylene polymer has a xylene solubles content of greater than about 5%.

8. The polymer composition of claim 1, wherein the visbroken polypropylene polymer displays an Izod impact resistance of greater than about 450 J/m and less than about 1100 J/m.

9. The polymer composition of claim 2, wherein the nucleating agent comprises a nonitol, a sorbitol, a phosphate ester, and a dicarboxylate metal salt, or mixtures thereof, the nucleating agent is present in the polymer composition in an amount greater than about 400 ppm and less than about 5000 ppm.

10. The polymer composition of claim 1, wherein the polymer composition contains the visbroken polypropylene polymer in an amount greater than about 70% by weight.

11. The polymer composition of claim 1, wherein the random propylene and alpha-olefin copolymer comprises a random propylene and ethylene copolymer containing ethylene in an amount of from about 3.7% to about 4.6% by weight, the visbroken polypropylene polymer has a xylene solubles content of from about 8% to about 15% by weight, the visbroken polypropylene polymer has a melt flow rate of from about 0.6 g/10 min to about 4 g/10 min, and the polymer composition contains a nucleating agent and wherein the polymer composition displays a haze at 1 mm of less than about 15%.

12. The polymer composition of claim 1, wherein the visbroken polypropylene polymer is Ziegler-Natta catalyzed using a phthalate-free catalyst.

13. The polymer composition of claim 1, wherein the visbroken polypropylene polymer has a molecular weight distribution of less than about 5.

14. A molded article formed from the polymer composition of claim 1.

15. The molded article of claim 14, wherein the molded article is an injection molded article, an extrusion blow molded article or a thermoformed article.

16. A storage container formed from the polymer composition of claim 1.

17. The storage container of claim 16, wherein the storage container comprises food packaging or a bottle.

18. A method of preparing a visbroken polypropylene polymer comprising visbreaking a monomodal polypropylene polymer, the monomodal polypropylene polymer comprising a random propylene and alpha-olefin copolymer, wherein the monomodal polypropylene polymer has an initial melt flow rate of less than about 0.5 g/10 min at 230° C. and at a load of 2.16 kg, the random propylene and alpha-olefin copolymer contains the alpha-olefin in an amount of from about 2.5% to about 5.7% by weight, the visbroken polypropylene polymer has a xylene soluble content of from about 6% to about 20% by weight, and wherein the monomodal polypropylene polymer is visbroken so as to achieve a cracking ratio of greater than 3, the visbroken polypropylene polymer has an Izod impact resistance at 23° C. of greater than about 400 J/m.

19. The method of claim 18, wherein the polypropylene polymer is a random propylene and ethylene copolymer.

20. The method of claim 18, wherein the visbroken polypropylene polymer is a monomodal polymer.

* * * * *